United States Patent
Kim et al.

(10) Patent No.: US 10,312,480 B2
(45) Date of Patent: Jun. 4, 2019

(54) CELL PACKING MATERIAL AND METHOD OF MANUFACTURING THE SAME

(71) Applicant: LG CHEM, LTD., Seoul (KR)

(72) Inventors: Heon Kim, Daejeon (KR); Yong Suk Kim, Daejeon (KR); Yeong Rae Chang, Daejeon (KR); Hye Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 609 days.

(21) Appl. No.: 14/780,808

(22) PCT Filed: Jun. 18, 2014

(86) PCT No.: PCT/KR2014/005333
§ 371 (c)(1),
(2) Date: Sep. 28, 2015

(87) PCT Pub. No.: WO2014/204190
PCT Pub. Date: Dec. 24, 2014

(65) Prior Publication Data
US 2016/0056421 A1  Feb. 25, 2016

(30) Foreign Application Priority Data
Jun. 18, 2013 (KR) .................. 10-2013-0069829

(51) Int. Cl.
| | | |
|---|---|---|
| *H01M 2/02* | (2006.01) | |
| *B32B 27/08* | (2006.01) | |
| *B32B 27/18* | (2006.01) | |
| *B32B 27/30* | (2006.01) | |
| *B32B 27/32* | (2006.01) | |
| *B32B 27/34* | (2006.01) | |
| *B32B 15/08* | (2006.01) | |
| *B32B 15/20* | (2006.01) | |

(52) U.S. Cl.
CPC .......... *H01M 2/0287* (2013.01); *B32B 15/08* (2013.01); *B32B 15/20* (2013.01); *B32B 27/08* (2013.01); *B32B 27/18* (2013.01); *B32B 27/306* (2013.01); *B32B 27/308* (2013.01); *B32B 27/32* (2013.01); *B32B 27/34* (2013.01); *H01M 2/0277* (2013.01); *H01M 2/0285* (2013.01); *B32B 2255/06* (2013.01); *B32B 2255/10* (2013.01); *B32B 2255/205* (2013.01); *B32B 2255/26* (2013.01); *B32B 2307/306* (2013.01); *B32B 2307/31* (2013.01); *B32B 2307/50* (2013.01); *B32B 2307/546* (2013.01); *B32B 2307/554* (2013.01); *B32B 2307/584* (2013.01); *B32B 2307/714* (2013.01); *B32B 2307/7242* (2013.01); *B32B 2439/40* (2013.01); *B32B 2457/10* (2013.01); *B32B 2553/00* (2013.01); *H01M 2/0275* (2013.01)

(58) Field of Classification Search
None
See application file for complete search history.

(56) References Cited

U.S. PATENT DOCUMENTS

| | | | | |
|---|---|---|---|---|
| 9,349,778 | B2 * | 5/2016 | Kim | .............. H01L 51/5253 |
| 9,403,991 | B2 * | 8/2016 | Kang | .............. C08J 5/18 |
| 2003/0138398 | A1 | 7/2003 | Okumura et al. | |
| 2008/0097039 | A1 * | 4/2008 | Ito | .............. B01J 20/26 |
| | | | | 525/384 |
| 2009/0214871 | A1 * | 8/2009 | Fukuda | .............. C09D 4/00 |
| | | | | 428/413 |
| 2010/0190019 | A1 * | 7/2010 | Ito | .............. C08B 37/0015 |
| | | | | 428/500 |
| 2011/0105688 | A1 | 5/2011 | Ruslim et al. | |
| 2011/0212361 | A1 | 9/2011 | Kim et al. | |
| 2012/0183706 | A1 * | 7/2012 | Kang | .............. H01M 2/0275 |
| | | | | 428/29 |
| 2014/0079937 | A1 * | 3/2014 | Jung | .............. C08B 37/0012 |
| | | | | 428/220 |
| 2014/0134475 | A1 * | 5/2014 | Kuramoto | .............. B32B 7/12 |
| | | | | 429/176 |
| 2016/0306452 | A1 * | 10/2016 | Jung | .............. G02F 1/13338 |

FOREIGN PATENT DOCUMENTS

| | | |
|---|---|---|
| CN | 1938367 A | 3/2007 |
| EP | 2174960 A1 | 4/2010 |
| EP | 2279266 A1 | 9/2014 |
| JP | 2001-307688 A | 11/2001 |

(Continued)

OTHER PUBLICATIONS

Ozawa, Shinji et al.,"Crosslinked Polyrotaxane and Its Production Method", machine translation of JP 2006-241396A, published Sep. 14, 2006. (Year: 2006).*
Hiroyasu, Yamaguchi and Akira Harada, "Polyrotaxane: Synthesis, Structure, and Chemical Properties", 2014, Encyclopedia of Polymeric Nanomaterials, Springer-Verlag Berlin Heidelberg, pp. 1-7.*
International Search Report, issued in PCT/KR2014/005333, dated Sep. 23, 2014.
Extended European Search Report dated Oct. 24, 2016, for European Application No. 14813235.0.
Taiwanese Office Action and Search Report, dated Oct. 14, 2015, for Taiwanese Application No. 103121025, with English translation thereof.

*Primary Examiner* — Anish P Desai
(74) *Attorney, Agent, or Firm* — Birch, Stewart, Kolasch & Birch, LLP (57) ABSTRACT

A cell packing material and a method of manufacturing the same are provided. More particularly, a cell packing material including a sealant layer, a gas barrier layer formed on the sealant layer, and an outer layer formed on the gas barrier layer, the outer layer including a polyrotaxane-based compound, and a method of manufacturing the same are provided. The cell packing material includes the outer layer having excellent elongation, scratch resistance, and chemical resistance, and thus can be easily molded into a pouch, and exhibit improved durability, and the like.

13 Claims, 3 Drawing Sheets

(56) References Cited

FOREIGN PATENT DOCUMENTS

| | | | |
|---|---|---|---|
| JP | 2002-216714 A | 8/2002 | |
| JP | 2004-311227 A | 11/2004 | |
| JP | 2005-294212 A | 10/2005 | |
| JP | 2007-257952 A | 10/2007 | |
| JP | 2009-270120 A | 11/2009 | |
| JP | 2012-124067 A | 6/2012 | |
| JP | WO 2012133683 A1 * | 10/2012 | ............... B32B 7/12 |
| KR | 2001-0052645 A | 6/2001 | |
| KR | 10-0574819 B1 | 4/2006 | |
| KR | 10-2008-0058823 A | 6/2008 | |
| KR | 10-0887616 B1 | 3/2009 | |
| KR | 10-2011-0011611 A | 2/2011 | |
| KR | 10-1050007 B1 | 7/2011 | |
| KR | 10-2013-0011976 A | 1/2013 | |
| KR | 101295325 B1 * | 8/2013 | ......... C08B 37/0012 |
| WO | WO 2008/078948 A1 | 7/2008 | |
| WO | WO 2012/133683 A1 | 10/2012 | |
| WO | WO 2013-069698 A1 | 5/2013 | |

* cited by examiner

CELL PACKING MATERIAL AND METHOD OF MANUFACTURING THE SAME

CROSS-REFERENCE TO RELATED APPLICATION

This application claims priority to and the benefit of Korean Patent Application No. 2013-0069829, filed Jun. 18, 2013, the disclosure of which is incorporated herein by reference in its entirety.

BACKGROUND

1. Field of the Invention

The present invention relates to a cell packing material and a method of manufacturing the same, and more particularly, to a cell packing material including an outer layer having improved physical properties, which is capable of being easily molded into a pouch and exhibiting excellent durability, and the like, and a method of manufacturing the same.

2. Discussion of Related Art

In general, cells such as secondary batteries are packed in flexible pouches. This is particularly true of polymer batteries such as lithium polymer batteries or secondary battery cells such as electrical double-layer capacitors or pseudo-capacitors. Cell pouches for packing such cells have been formed of a multilayer packing material (in the form of a sheet or film) in consideration of gas barrier properties, electrolyte resistance, and thermal adhesivity.

Figure 1:
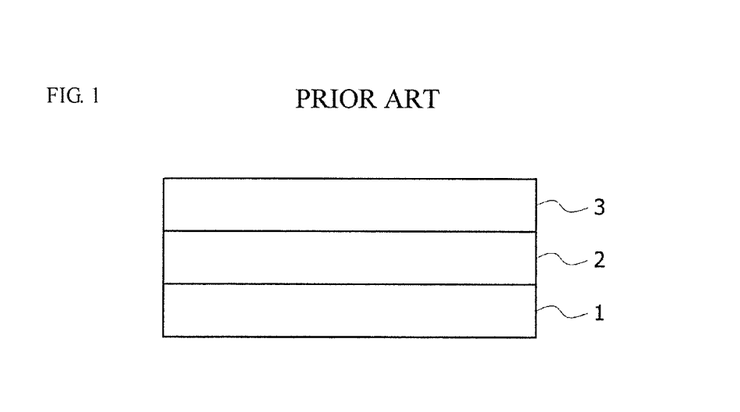
FIG. 1 is a cross-sectional view showing a cell packing material according to the prior art.

FIG. 1 is a cross-sectional view showing a cell packing material according to the prior art.

Referring to FIG. 1, the cell packing material is in the form of a sheet (or film). In this case, the cell packing material generally has a laminated structure including a sealant layer 1, a gas barrier layer 2 formed on the sealant layer 1, and an outer layer 3 formed on the gas barrier layer 2.

For example, Korean Patent Nos. 10-0574819, 10-0887616 and 10-1050007, and Korean Unexamined Patent Application Publication No. 10-2001-0052645 disclose cell packing materials (cell pouches) each having the laminated structure as described above.

The cell pouches are prepared by processing a packing material on a film (or a sheet) having the above-described laminated structure in the form of a pocket or a box. Cell components such as an anode, a cathode and a separator are packed in such a cell pouch in a state in which the cell components are dipped in an electrolyte solution.

The sealant layer 1 comes in contact with an article disposed in the innermost layer to be packed, that is, a battery cell. In this case, after the cell components are packed in the cell pouch, the entrance of the cell pouch remains hermetic since the sealant layers 1 adjoin each other to thermally adhere (thermally seal) the entrance of the cell pouch. For this purpose, a thermally adhesive resin is used as the sealant layer 1. The gas barrier layer 2 serves to prevent the flow of a gas into and from the cell pouch. In this case, an aluminum (Al) thin film (i.e., Al foil) is widely used as the gas barrier layer 2.

Also, the outer layer 3 serves to protect the gas barrier layer 2. In this case, the outer layer 3 should be chosen in consideration of heat resistance or wear resistance. For this purpose, polyethylene terephthalate (PET) is widely used as the outer layer 3.

However, the cell packing material according to the prior art has a problem in that moldability may be degraded when the cell packing material is processed into pouches. More particularly, the cell packing material is bent in the form of a pocket or box to be processed into a pouch as described above so as to pack the cells. In this case, the PET constituting the outer layer 3 has poor bending processability due to its low elongation. Therefore, PET has a problem in that it is difficult to mold into a pouch.

Further, the PET constituting the outer layer 3 has problems in that it has poor wear resistance, scratch resistance and chemical resistance and exhibits degraded durability. In particular, the surface of the PET may be easily scratched, and the scratches are not easily erased. Therefore, in the preparation of the cell packing material, in most cases, a nylon resin layer and a PET layer are sequentially laminated on the gas barrier layer 2 so as to reinforce durability, and the like. In this case, the cell packing material has problems in that it has poor wear resistance and scratch resistance as well as poor moldability, and it is also manufactured through complicated processes.

SUMMARY OF THE INVENTION

The present invention is directed to providing a cell packing material having improved characteristics, and a method of manufacturing the same.

For example, the present invention is directed to providing a cell packing material which includes an outer layer having excellent elongation, scratch resistance, and chemical resistance, and thus can be easily molded into a pouch, exhibit excellent durability, and the like.

The cell packing material includes the outer layer having excellent elongation, scratch resistance, and chemical resistance, and thus can be easily molded into a pouch, exhibit improved durability, and the like.

One aspect of the present invention provides a cell packing material including a sealant layer, a gas barrier layer formed on the sealant layer, and an outer layer formed on the gas barrier layer. Here, the outer layer may include a polyrotaxane-based compound.

In this case, the polyrotaxane-based compound may include a cyclic compound, a linear molecule passing through the cyclic compound, and a blocking group disposed at an end of the linear molecule to prevent secession of the cyclic compound. In addition, the polyrotaxane-based compound may have a structure in which at least one selected from a caprolactone-based compound and a (meth) acrylic compound is bound to (introduced into) the molecule.

Another aspect of the present invention provides a method of manufacturing a cell packing material. Here, the method includes preparing a laminate including a sealant layer and a gas barrier layer formed on the sealant layer, and forming an outer layer on the gas barrier layer. Here, the forming of the outer layer may be performed using a composition including a polyrotaxane-based compound.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Figure 2:
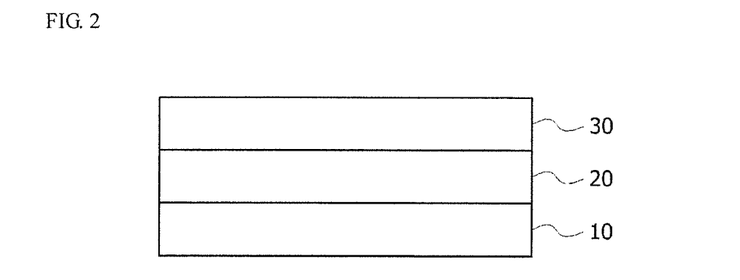
FIG. 2 is a cross-sectional view showing a cell packing material according to a first exemplary embodiment of the present invention.
Figure 3:
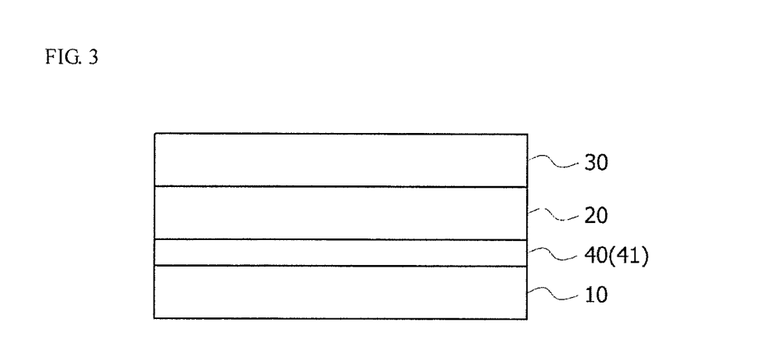
FIG. 3 is a cross-sectional view showing a cell packing material according to a second exemplary embodiment of the present invention.
Figure 4:
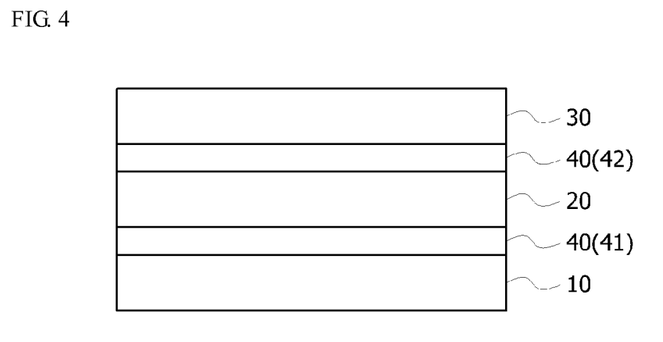
FIG. 4 is a cross-sectional view showing a cell packing material according to a third exemplary embodiment of the present invention.

FIGS. 2 to 4 are cross-sectional views illustrating cell packing materials according to exemplary embodiments of the present invention. Referring to FIGS. 2 to 4, the cell packing material according to one exemplary embodiment of the present invention has a multilayer structure, and is in the form of a film (or a sheet).

The cell packing material according to one exemplary embodiment of the present invention includes a sealant layer 10, a gas barrier layer 20 formed on the sealant layer 10, and an outer layer 30 formed on the gas barrier layer 20.

Also, the cell packing material according to one exemplary embodiment of the present invention may include at least separate layers in addition to the sealant layer 10, the gas barrier layer 20, and the outer layer 30. For example, an intermediate layer 40 may be further formed between the sealant layer 10 and the gas barrier layer 20, and/or between the gas barrier layer 20 and the outer layer 30 (see FIGS. 3 and 4). In this case, the intermediate layer 40 may, for example, exhibit adhesive properties, insulating properties, chemical resistance (i.e., drug resistance), pinhole resistance, and/or other additional functionalities.

In the present invention, the outer layer 30 may have an outermost layer of the cell packing material according to one exemplary embodiment of the present invention formed therein. However, layers may be included in the outer layer 30 as long as they are formed outside the gas barrier layer 20. More particularly, the cell packing material according to one exemplary embodiment of the present invention has a structure in which the sealant layer 10 is formed inside the gas barrier layer 20 and the outer layer 30 is formed outside the gas barrier layer 20. According to an exemplary shape of the cell packing material, another separate layer, for example, at least one layer selected from the group consisting of a printing layer, a flame retardant layer, and/or a surface protective layer configured to protect the printing layer and/or flame retardant layer, may be laminated to be formed on the outer layer 30. One of these layers may be formed as the outermost layer.

The cell packing material according to one exemplary embodiment of the present invention may have a multilayer structure of at least three layers including the sealant layer 10, the gas barrier layer 20, and the outer layer 30. FIG. 2 shows a laminated structure of the cell packing material in which the sealant layer 10, the gas barrier layer 20 and the outer layer 30 are sequentially formed from a lower portion thereof according to the first exemplary embodiment of the present invention.

Also, FIG. 3 shows a laminated structure of the cell packing material in which the sealant layer 10, the intermediate layers 40 and 41, the gas barrier layer 20 and the outer layer 30 are sequentially formed from a lower portion thereof according to the second exemplary embodiment of the present invention. In addition, FIG. 4 shows a laminated structure of the cell packing material in which the sealant layer 10, the intermediate layers 40 and 41, the gas barrier layer 20, the intermediate layers 40 and 42 and the outer layer 30 are sequentially formed from a lower portion thereof according to the third exemplary embodiment of the present invention.

In the present invention, the gas barrier layer 20 may be used without particular limitation as long as it exhibits gas barrier properties. It is desirable that the gas barrier layer 20 may block the inflow of external moisture and air and the outflow of gases generated therein. For example, the gas barrier layer 20 may include at least one selected from the group consisting of a metal thin film, and a metal deposition layer.

Examples of metals constituting the gas barrier layer 20, particularly, metals constituting the metal thin film or the metal deposition layer, may, for example, include at least one (i.e., a single metal or a single combination of metals) selected from the group consisting of aluminum (Al), iron (Fe), copper (Cu), nickel (Ni), tin (Sn), zinc (Zn), indium (In), tungsten (W), and an alloy thereof. More particularly, the metal may, for example, be selected from Al and an Al alloy.

Further, in the case of the metal thin film, a metal thin film surface-treated with phosphoric acid or chromium may be used for corrosion resistance. Metal foil having a thickness of 1 μm (micrometer) to 300 μm may, for example, be used as the metal thin film. In this case, the metal foil may, for example, be co-extruded in a co-extruder in a state in which an adhesive is added to the co-extruder, and may be joined together with the sealant layer 10.

Also, the metal deposition layer is formed through deposition. In this case, the metal deposition layer may be formed on the sealant layer 10 or the outer layer 30 through vacuum deposition, or may be formed on another plastic film, for example, a PET, polyethylene (PE) or polypropylene (PP) film, through vacuum deposition. Such a metal deposition layer may, for example, have a thickness of 1 nm (nanometer) to 300 μm.

When a cell is packed (installed), the sealant layer 10 may be used without particular limitation as long as it can be adhered (fused) by heat, thereby giving sealing properties. The sealant layer 10 includes a sealing resin exhibiting thermal adhesivity (heat fusion properties) as a base resin.

The sealing resin may be used without limitation as long as it can be adhered (fused) by heat. Preferably, resins exhibiting insulating properties and/or electrolyte resistance in addition to the thermal adhesivity may be desirably used. For example, the sealing resin may be selected from low melting point resins which can be thermally fused at a low temperature. Specific examples of the sealing resin that may be used herein may include at least one selected from the group consisting of a polyolefin such as polypropylene (PP) or polyethylene (PE); a copolymer of the polyolefin or a derivative thereof; and ethylenevinyl acetate (EVA). Also, the sealing resin may be chosen from copolymers or terpolymers, for example, an ethylene/propylene copolymer or an ethylene/propylene/butadiene terpolymer (i.e., a three-component copolymer), or the like.

According to one exemplary embodiment, the sealing resin may include a PP-based resin. More particularly, the sealing resin may include a PP-based resin selected from the group consisting of a homo polypropylene (homo-PP), a PP copolymer, and a PP terpolymer, which may be used alone or in combination with the PE- or EVA-based resin. Such a PP resin may have good thermal adhesivity (sealing properties) and insulating properties, and also exhibit excellent mechanical properties such as tensile strength, and excellent chemical resistance such as electrolyte resistance, and thus may be useful in the present invention.

Also, the sealant layer 10 may further include another component in addition to the sealing resin such as the PP-based resin. For example, the sealant layer 30 may further include at least one reinforcing resin selected from the group consisting of a modified polyethylene (modified PE), a modified PP, an acrylic resin (i.e., an acrylate, etc.), and a modified acrylic resin (i.e., a modified acrylate, etc.). Such a reinforcing resin may be included in the sealant layer 10 so that the reinforcing resin can improve interlayer adhesion with the gas barrier layer 20 (FIG. 2) or the intermediate layer 41 (FIGS. 3 and 4) while reinforcing thermal adhesive strength (i.e., sealing properties), thereby improving electrolyte resistance, and the like.

In addition, the sealant layer 10 may have a multilayer structure. For example, the sealant layer 10 may have a structure in which two resins are selected and formed into two different layers as described above.

As such, the sealant layer 10 may be joined together with the gas barrier layer 20 or the intermediate layer 41 through coating. In the present invention, the coating encompasses coatings through co-extrusion as well as conventional coatings such as bar coating, spray coating, and dipping.

Also, the sealant layer 10 may, for example, have a thickness of 0.1 μm to 500 μm. By way of specific example, the sealant layer 30 may have a thickness of 3.0 μm to 300 μm for good thermal adhesive strength (i.e., sealing strength).

The outer layer 30 may be directly laminated to be formed on the gas barrier layer 20 or the intermediate layers 40 and 42 through coating. Also, the outer layer 30 may be formed using a transfer method of forming a coating layer on a separate release film and laminating the release film on the gas barrier layer 20 or the intermediate layer 42 so that the release film can be joined together with the gas barrier layer 20 or the intermediate layer 42. In this case, the transfer method is not particularly limited.

The outer layer 30 includes a polyrotaxane-based compound. That is, the outer layer 30 includes at least a polyrotaxane-based compound. According to one exemplary embodiment, the outer layer 30 includes at least the polyrotaxane-based compound, and may also include another separate resin. According to one exemplary embodiment of the present invention, the outer layer 30 includes the polyrotaxane-based compound, and thus exhibits at least high elongation characteristics. In addition, the outer layer 30 has excellent wear resistance, scratch resistance, and chemical resistance (i.e., drug resistance). According to one exemplary embodiment, the outer layer 30 also has an ability to rapidly erase scratches due to the self-healing capability of the polyrotaxane-based compound.

Therefore, the cell packing material according to one exemplary embodiment of the present invention may be easily molded into a cell pouch. More particularly, when the cell packing material according to one exemplary embodiment of the present invention is processed into predetermined shapes (for example, shapes of a pocket, a box, and the like), the cell packing material may be easily molded due to excellent bending processability since the outer layer 30 exhibits high elongation characteristics. Also, the cell packing material has improved wear resistance, scratch resistance, and chemical resistance, resulting in excellent durability. Further, even when scratches are formed by an external force, the scratches may be rapidly erased due to the self-healing capability.

In the present invention, the polyrotaxane-based compound may be used without limitation as long as it is a compound (i.e., a polymer) including one or more polyrotaxanes in the molecule. In this case, the polyrotaxane-based compound may include a thermosetting compound and a photocurable compound. In the present invention, the photocurable compound is, for example, a UV-curable compound which is cured by irradiation with ultraviolet rays (UV rays).

Figure 5:
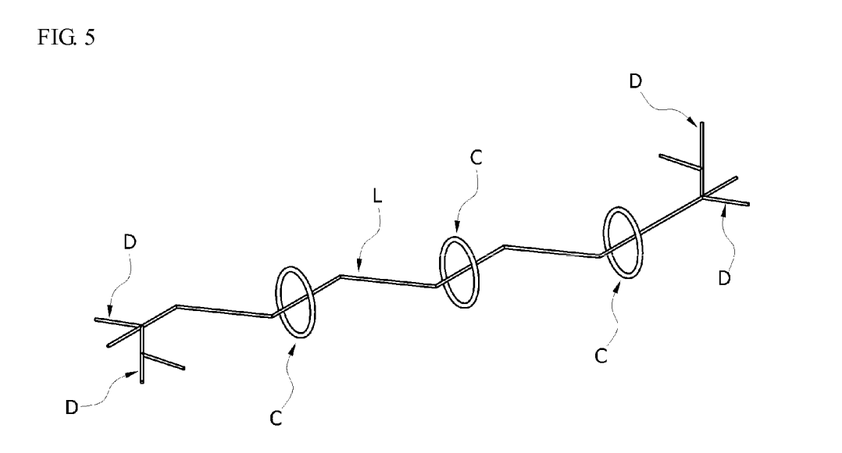
FIG. 5 is a schematic molecular view illustrating a polyrotaxane used in the present invention.

Also, it is desirable that the polyrotaxane include a cyclic compound, a linear molecule passing through the cyclic compound, and a blocking group disposed at an end of the linear molecule to prevent secession of the cyclic compound. FIG. 5 is a schematic molecular view illustrating a polyrotaxane. In FIG. 5, the reference mark "C" represents a cyclic compound, "L" represents a linear molecule, and "D" represents a blocking group.

The one or two or more cyclic compounds may be inserted in the linear molecule. The cyclic compound may be used without particular limitation as long as it has one or more ring structures in the molecule. For example, the cyclic compound may include a heterocyclic compound. In this case, it is also desirable that the cyclic compound contain a functional group capable of reacting with another compound in the molecule. The cyclic compound may, for example, contain at least one functional group selected from the group consisting of a hydroxyl group, an amino group, a carboxyl group, a thiol group, and an aldehyde group. Specific examples of such a cyclic compound may include α-cyclodextrin, β-cyclodextrin, γ-cyclodextrin, and/or derivatives thereof.

The linear molecule is not particularly limited. For example, the linear molecule may be selected from the group consisting of a polyolefin-based molecule (i.e., a polyethylene, a polypropylene, and the like), a polycaprolactone-based molecule, a polyester-based molecule, a polyvinyl chloride-based molecule, a polyacrylic molecule (i.e., a poly(meth)acrylic acid, a polymethylmethacrylate, a (meth)acrylic acid-ester copolymer, an acrylonitrile-methylacrylate copolymer, and the like), a polycarbonate-based molecule, a polyurethane-based molecule, a vinyl chloride-vinyl acetate copolymer, a polyvinyl alcohol, a polyvinylpyrrolidone, a polyacrylamide, and derivatives or denaturants thereof.

The blocking group may be used without particular limitation as long as it can prevent secession of the cyclic compound from the linear molecule. For example, the blocking group may be a substituent for the above-listed compounds, and may be selected from the group consisting of dinitrophenyl, cyclodextrin, adamantane, trityl, fluorescein, and pyrene groups. Also, the blocking group may be, for example, selected from substituents such as an alkyl, an alkyloxy, a hydroxy, a halogen, a cyano, a sulfonyl, a carboxyl, an amino, and a phenyl.

Also, the polyrotaxane-based compound may include a caprolactone-based compound. That is, the polyrotaxane-based compound may have a caprolactone-based chain. The caprolactone-based compound may be bound in the molecule of the polyrotaxane-based compound at one or more positions. For example, the caprolactone-based compound may be bound to at least one selected from the group consisting of the cyclic compound, the linear molecule, and the blocking group, all of which constitute the polyrotaxane-based compound.

The caprolactone-based compound may be used without particular limitation as long as it has one or more caprolactone groups in the molecule. For example, the caprolactone-based compound may be selected from a caprolactone having 3 to 12 carbon atoms; a polycaprolactone-based compound including the caprolactone having 3 to 12 carbon atoms as a repeating unit; and a derivative thereof.

According to one exemplary embodiment, the caprolactone-based compound may be bound to the cyclic compound of the polyrotaxane-based compound at a binding position. The caprolactone-based compound may be bound to a main chain and/or a side chain of the cyclic compound. In this case, the caprolactone-based compound may be directly bound to the main chain and/or side chain of the cyclic compound, or may be bound to the main chain and/or side chain of the cyclic compound via an oxyalkylene group having 1 to 10 carbon atoms.

In addition, the outer layer 30 may include the caprolactone-based compound at 2% by weight or more, 5% by weight or more, or 10% by weight or more, based on the total weight of the outer layer 30. For example, the outer layer 30 may include the caprolactone-based compound at 5 to 85% by weight, or 10 to 80% by weight, based on the total weight of the outer layer 30. When the outer layer 30 includes the caprolactone-based compound within this content range, mechanical properties such as wear resistance and scratch resistance may be further improved.

According to one exemplary embodiment of the present invention, the polyrotaxane-based compound may also have a (meth)acrylate introduced thereinto. The introduction position and number of the (meth)acrylate are not limited. One or more (meth)acrylates may be introduced into (bound to) the molecule of the polyrotaxane-based compound. For example, the (meth)acrylate may be introduced into at least one selected from the group consisting of the cyclic compound, the linear molecule, and the blocking group, all of which constitute the polyrotaxane-based compound. In the present invention, the introduction includes substitutions and bonds (single bonds and cross-linked bonds). As such, when the (meth)acrylate is introduced, the polyrotaxane-based compound may have higher mechanical properties such as elongation, wear resistance and scratch resistance, and may also exhibit a further improved self-healing capability. In the present invention, the term '(meth)acrylate' is used with a meaning encompassing both a (meth)acrylate and an acrylate.

According to one exemplary embodiment, the polyrotaxane-based compound may be a compound in which a caprolactone-based compound is bound to the cyclic compound and at least one (meth)acrylate may be introduced into an end of the caprolactone-based compound. As such, when the polyrotaxane-based compound is the compound in which the caprolactone-based compound is bound to the cyclic compound and at least one (meth)acrylate is introduced into the end of the caprolactone-based compound, an OH value of the polyrotaxane-based compound may be lowered, thereby further improving the mechanical properties. In this case, the (meth)acrylic compound may be directly bound to the end of the caprolactone-based compound, or may be bound to the end of the caprolactone-based compound via a urethane bond (—NH—CO—O—), an ether bond (—O—), an ester bond (—COO—), and/or a thioester bond (—S—COO—).

Also, the (meth)acrylate may, for example, contain at least one functional group selected from the group consisting of an isocyanate group, a carboxyl group, a hydroxyl group, a thioate group, and a halogen. In this case, the (meth)acrylate may be bound to the caprolactone-based compound by means of such a functional group. In addition, the (meth)acrylate may be cross-linked to the caprolactone-based compound by means of an additional cross-linking agent. In this case, the cross-linking agent may, for example, include an oxyalkylene group having 1 to 10 carbon atoms, and the like.

Further, the polyrotaxane compound may have a structure as described above, and thus may, for example, have a weight average molecular weight of 100,000 to 800,000, preferably 200,000 to 700,000, and more preferably 350,000 to 650,000. In this case, when the weight average molecular weight of the polyrotaxane-based compound is very small, mechanical properties or a self-healing capability may be insignificant. On the other hand, when the weight average molecular weight of the polyrotaxane-based compound is very high, coatability or appearance properties (i.e., surface properties) of the outer layer 30 may be rather degraded. In the present invention, the weight average molecular weight means a value converted from that of a polystyrene standard as measured using gel permeation chromatography (GPC).

The outer layer 30 is formed of a composition including the above-described polyrotaxane-based compound, and the composition for forming the outer layer 30 may be selected from a thermosetting composition, and a photocurable composition. In addition, such a composition may further include another polymer or additive in addition to the polyrotaxane-based compound.

For example, the outer layer 30 may be formed of the thermosetting composition. Here, according to a first compositional example of the present invention, the thermosetting composition may include the polyrotaxane-based compound at 5 to 40 parts by weight, a hydroxyl-group-modified oligomer at 5 to 30 parts by weight, a polyol-based resin at 5 to 10 parts by weight, and a curing agent at 10 to 40 parts by weight. Unless particularly defined otherwise in this specification, the weight unit "part(s) by weight" refers to a relative weight ratio between respective components. For example, the parts by weight in the thermosetting composition (the first compositional example) refer to a weight ratio of (5 to 40):(5 to 30):(5 to 10):(10 to 40) for the polyrotaxane-based compound, the hydroxyl-group-modified oligomer, the polyol-based resin, and the curing agent, as follows.

In this case, in the first compositional example, when the content of the polyrotaxane-based compound is less than 5 parts by weight, it may be difficult to realize desired high elongation and high scratch resistance (self-healing capability, and the like) in the present invention. On the other hand, when the content of the polyrotaxane-based compound is greater than 40 parts by weight, an increase in effect according to addition of an excessive amount of the polyrotaxane-based compound may be insignificant, and it is undesirable in an aspect of expense.

For example, the hydroxyl-group-modified oligomer may improve mechanical strength such as wear resistance. In this case, the hydroxyl-group-modified oligomer may be, for example, selected from ethoxylate, 1,6-hexanediol-diacrylate, tripropylene glycol diacrylate, ethylene glycol diacrylate, trimethylolpropane triacrylate, pentaerythritol triacrylate, dipentaerythritol pentaacrylate, dipentaerythritol hexaacrylate, di-trimethylolpropane triacrylate, and butanediol diacrylate. In this case, when the content of the hydroxyl-group-modified oligomer is less than 5 parts by weight, an effect of improving wear resistance according to addition of the hydroxyl-group-modified oligomer may be insignificant. On the other hand, when the content of the hydroxyl-group-modified oligomer is greater than 30 parts by weight, it is difficult to realize high elongation and high scratch resistance due to a relative decrease in the content of the polyrotaxane-based compound.

The polyol-based resin may improve miscibility of the polyrotaxane-based compound with the hydroxyl-group-modified oligomer. For example, the polyol-based resin may be selected from a polyether glycol and/or a polyester glycol. More particularly, the polyol-based resin may be selected from polyethylene glycol and polypropylene glycol. The curing agent may be selected from isocyanate-based compounds. In this case, when the polyol-based resin and the curing agent are present within these content ranges, the polyol-based resin and the curing agent may give good characteristics (miscibility and curability), respectively.

By way of another example, the outer layer 30 is also formed of a photocurable composition. Here, according to a second compositional example of the present invention, the photocurable composition may include the polyrotaxane-based compound at 5 to 88 parts by weight, a polymer resin or a precursor thereof at 10 to 88 parts by weight, and a photoinitiator at 0.01 to 10 parts by weight.

For example, the polymer resin or precursor thereof may improve wear resistance and/or interlayer adhesive properties. The polymer resin may be, for example, selected from a polycaprolactone-modified acrylate, a silicone-modified acrylate, a urethane acrylate, a poly(meth)acrylic acid, a polymethylmethacrylate, a (meth)acrylic acid-ester copolymer, an acrylonitrile-methylacrylate copolymer, a polysiloxane-based resin, a urethane resin, an epoxy resin, and derivatives or denaturants thereof. Also, examples of the precursor of the polymer resin may include salts of the above-described polymer resins (e.g., metal salts, and the like), or monomers or oligomers. Specific examples of the precursor of the polymer resin may include monomers or oligomers containing at least one functional group selected from the group consisting of a (meth)acrylate group, a vinyl group, a siloxane group, an epoxy group, and a urethane group. In this case, when the content of the polymer resin (or the precursor thereof) is less than 10 parts by weight, wear resistance and/or interlayer adhesive properties according to addition of the polymer resin may be insignificant. On the other hand, when the content of the polymer resin is greater than 88 parts by weight, it is difficult to realize high elongation and high scratch resistance due to a relative decrease in the content of the polyrotaxane-based compound.

Also, the photoinitiator may be used without limitation as long as it can initiate and/or promote a photocurable reaction (for example, a UV polymerization reaction). For example, the photoinitiator may be selected from a benzophenone-based photoinitiator, an acetophenone-based photoinitiator, and a benzoin ether-based photoinitiator. In this case, when the content of the photoinitiator is less than 0.01 parts by weight, UV-curable characteristics may be poor. On the other hand, when the content of the photoinitiator is greater than 10 parts by weight, an increase in effect according to addition of an excessive amount of the polyrotaxane-based compound may be insignificant.

By way of another example, the outer layer 30 is formed of a photocurable composition. Here, according to a third compositional example of the present invention, the photocurable composition may include the polyrotaxane-based compound at 5 to 88 parts by weight, a polycaprolactone-modified acrylate at 10 to 50 parts by weight, a silicone-modified acrylate at 5 to 30 parts by weight, a urethane acrylate at 10 to 50 parts by weight, and a photoinitiator at 0.01 to 10 parts by weight. Such a third compositional example may have high elongation and high scratch resistance, and may also exhibit excellent chemical resistance, wear resistance and interlayer adhesion, and effective photocurable characteristics.

In this case, the polyrotaxane-based compound according to the second and third compositional examples may be selected from UV-curable compounds. Here, the (meth)acrylate may be introduced into the polyrotaxane-based compound, as described above. More particularly, the polyrotaxane-based compound may be selected from UV-curable compounds in which the caprolactone-based compound is bound to the cyclic compound and the (meth)acrylate is introduced into the end of the caprolactone-based compound.

Also, each of the thermosetting and photocurable compositions for forming the outer layer 30 may further include a solvent to promote coatability in addition to the above-described components. In this case, the solvent may be water, an organic solvent, and a mixture thereof. For example, at least one selected from the group consisting of methyl ethyl ketone, cyclohexanone, N-methylpyrrolidone, dimethylformamide, dimethylacetamide, isopropyl alcohol, hexafluoroisopropyl alcohol, ethyl cellosolve, tetrahydrofuran, toluene, xylene, benzene, acetone, ethyl acetate, dimethyl sulfoxide, and acetonitrile may be used as the organic solvent. Such a solvent is not particularly limited. For the thermosetting composition, the solvent may be, for example, included at a content of 20 to 300 parts by weight, based on 5 to 40 parts by weight of the polyrotaxane-based compound. In addition, the solvent may be included at a content of 0.1 to 200 parts by weight in the photocurable composition, based on 5 to 88 parts by weight of the polyrotaxane-based compound.

The above-described compositions, that is, the compositions according to the first, second and third compositional examples may be effective in improving physical properties. More particularly, the above-described compositions are subjected to a thermosetting or photocurable process to form the outer layer 30. In this case, the polyrotaxane compound may form cross-linked bonds with the above-described resin components (and/or monomers or oligomers). In this case, a network structure may be formed by such cross-linked bonds. Therefore, the outer layer 30 has high elongation and elastic recovery while maintaining high physical properties such as wear resistance and scratch resistance. As a result, even when scratches occur, a high self-healing capability may be realized.

In the present invention, the outer layer 30 includes the polyrotaxane-based compound. Here, the polyrotaxane-based compound may be included at a content of 5% by weight or more, based on the total weight of the outer layer 30, in order to achieve high elongation characteristics, and scratch resistance. By way of specific example, the outer layer 30 may include the polyrotaxane-based compound at 5 to 88% by weight, based on the total weight of the outer layer 30.

Also, the outer layer 30 includes the polyrotaxane-based compound, and thus may have an elongation of 10% or more. By way of specific example, the outer layer 30 may have an elongation of 10% to 500%. Within this content range, the outer layer 30 may exhibit good moldability into cell pouches. In the present invention, the elongation is a value calculated according to the following Equation when it is assumed that "A" is an initial gauge length of a test sample (for example, the outer layer 30) on a tensile tester, and "B" is a gauge length of the test sample at a point of time at which breaks occur after tensile elongation.

$$\text{Elongation } (\%) = (A-B)/A \times 100 \quad \text{[Equation]}$$

wherein A represents an initial length before tensile elongation of the outer layer (i.e., an initial gauge length on a tensile tester), and B represents a length at a point of time at which breaks occur after tensile elongation of the outer layer (i.e., a gauge length at a point of time at which the breaks occur on the tensile tester).

Further, the outer layer 30 may, for example, have a thickness of 0.1 μm to 200 μm. By way of specific example, the outer layer 30 may have a thickness of 5 μm to 100 μm.

Also, the outer layer 30 may, for example, have a glass transition temperature ($T_g$) of −80 to 100° C. When the outer layer 30 has this glass transition temperature ($T_g$), it has advantages in elongation, thermal stability, and mechanical stability. That is, when the glass transition temperature ($T_g$) of the outer layer 30 is very low (below −80° C.), for example, thermal stability and mechanical stability may be poor. On the other hand, when the glass transition temperature ($T_g$) of the outer layer 30 is very high (greater than 100° C.), for example, elongation and the like may be degraded.

In addition, the outer layer 30 may further include an additive without causing damage to elongation or scratch resistance. Examples of the additive may include at least one selected from a filler, an anti-fogging agent, a slip agent, an anti-blocking agent, a color pigment, a heat-resistant stabilizing agent, and a light stabilizing agent. In this case, these components and their contents are not particularly limited.

Meanwhile, the intermediate layer 40 is not particularly limited. For example, the intermediate layer 40 may be chosen from other layers having adhesive properties, insulating properties, chemical resistance, wear resistance, heat resistance, pinhole resistance, and/or other functionalities. Such an intermediate layer 40 may, for example, have a thickness of 0.1 μm to 100 μm, and particularly, a thickness of 5 μm to 80 μm.

In this case, the intermediate layer 41 (hereinafter referred to as a 'first intermediate layer') formed between the sealant layer 10 and the gas barrier layer 20 may be selected from layers having heat fusion properties chemical resistance, and/or adhesive properties. Considering these facts, the first intermediate layer 41 may, for example, include an acid-modified polypropylene resin (PP-acid). Such a PP-acid may have an advantageous influence on heat fusion properties of the sealant layer 10, and may also effectively improve interlayer adhesion of the gas barrier layer 20 to the sealant layer 10. For example, the PP-acid may be selected from unsaturated carboxylic acid graft random propylenes, and the like.

Also, the intermediate layer 42 (hereinafter referred to as a 'second intermediate layer') formed between the gas barrier layer 20 and the outer layer 30 may be selected from layers having insulating properties, chemical resistance, wear resistance, heat resistance, and/or pinhole resistance. Considering these facts, the second intermediate layer 42 may include at least one selected from a nylon resin and an olefin-based resin. Examples of the olefin-based resin may include a polyethylene (PE) resin, and a polypropylene (PP) resin. Also, an adhesive layer for interlayer adhesion may be further formed between the gas barrier layer 20 and the second intermediate layer 42, and between the second intermediate layer 42 and the outer layer 30, as necessary.

The cell packing material according to one exemplary embodiment of the present invention has a multilayer structure including the sealant layer 10, the gas barrier layer 20 and the outer layer 30 as described above. Here, the method of manufacturing the cell packing material is not particularly limited. The cell packing material according to one exemplary embodiment of the present invention may be, for example, manufactured using a method of manufacturing a cell packing material according to one exemplary embodiment of the present invention as will be described below.

The method of manufacturing a cell packing material according to one exemplary embodiment of the present invention includes (1) preparing a laminate; and (2) forming an outer layer 30 on the laminate.

In this case, it is desirable that the preparing of the laminate be a process performed to include a sealant layer 10 and a gas barrier layer 20 formed on the sealant layer 10. Also, the preparing of the laminate may further include forming intermediate layers 40 and 41 between the sealant layer 10 and the gas barrier layer 20; and/or forming intermediate layers 40 and 42 between the gas barrier layer 20 and the outer layer 30. In the preparing of the laminate, the respective layers may be joined together using a coating method (including a co-extrusion method), or joined together in a transfer method through a release film.

In the forming of the outer layer 30, the composition including the polyrotaxane-based compound as described above may be used. Such a composition for forming the outer layer 30 may be selected from the thermosetting and photocurable compositions as described above, and the specific components and contents of the thermosetting and photocurable compositions are as described above. In this case, the composition for forming the outer layer 30 may include a solvent to improve coatability, as described above.

To form the outer layer 30 on the laminate, according to one exemplary embodiment, the outer layer 30 may be formed by directly coating (including co-extruding) the thermosetting or photocurable composition on the laminate. According to another exemplary embodiment, the outer layer 30 may also be formed using a transfer method of coating the thermosetting or photocurable composition on a separate release film and laminating the release film on the laminate. Thereafter, the release film is separated and removed. In the case of the transfer method, an adhesive may be coated between the laminate and the outer layer 30, as necessary. For example, the adhesive may be selected from an acrylic adhesive, an epoxy-based adhesive, and a urethane-based adhesive.

In addition, when the outer layer 30 is formed using the thermosetting composition, the thermosetting composition may be coated, and then thermally cured, for example, at a temperature of 25° C. to 90° C. for 1 to 72 hours. In this case, when the temperature and time are less than these ranges during the thermal curing process, the composition may not be easily cured, or may be uncured. On the other hand, when the temperature and time are greater than these ranges, for example, the sealant layer 10 may be melted.

Also, when the outer layer 30 is formed using the photocurable composition, the photocurable composition may be coated and then UV-cured, for example, by irradiating the photocurable composition with UV rays at 150 to 250 mJ/cm$^2$ for 2 to 10 seconds. In this case, when the radiation and time are less than these ranges during the UV-curing process, the composition may not be easily cured, or may be uncured. On the other hand, when the radiation and time are greater than these ranges, an increase in effect may be insignificant, and it is undesirable in an aspect of energy efficiency.

According to the exemplary embodiments of the present invention as described above, the outer layer 30 includes at least the polyrotaxane-based compound, and thus has improved chemical resistance, wear resistance and scratch resistance as well as high elongation characteristics. Also, even when scratches occur, the outer layer 30 is resurfaced due to the self-healing capability, and has a high resurfacing rate. Therefore, the outer layer 30 may be easily molded due to high elongation when processed into a cell pouch. In addition, the cell packing material gives excellent chemical resistance, wear resistance and scratch resistance to an external surface of the cell pouch, thereby improving durability of the cell pouch, and the like.

Hereinafter, Examples and Comparative Examples of the present invention will be described in further detail. However, it should be understood that the following description is given by way of illustration of the present invention only, and is not intended to limit the scope of the present invention.

Preparation Example 1: Thermosetting Coating Composition 15 parts by weight of a hydroxyl-group-modified oligomer (IMP-ethoxylate commercially available from Aldrich), 10 parts by weight of ethylene glycol (Terathane 650 commercially available from INVISTA), 38 parts by weight of an isocyanate trimer (DN-980S commercially available from Aekyung Co. Ltd.), 50 parts by weight of methyl ethyl ketone (MEK), and 25 parts by weight of cyclohexanone were mixed with 5 parts by weight of a thermosetting polyrotaxane-based compound (SeRM A 1000 commercially available from ASM) to prepare a thermosetting coating composition.

Figure 6:
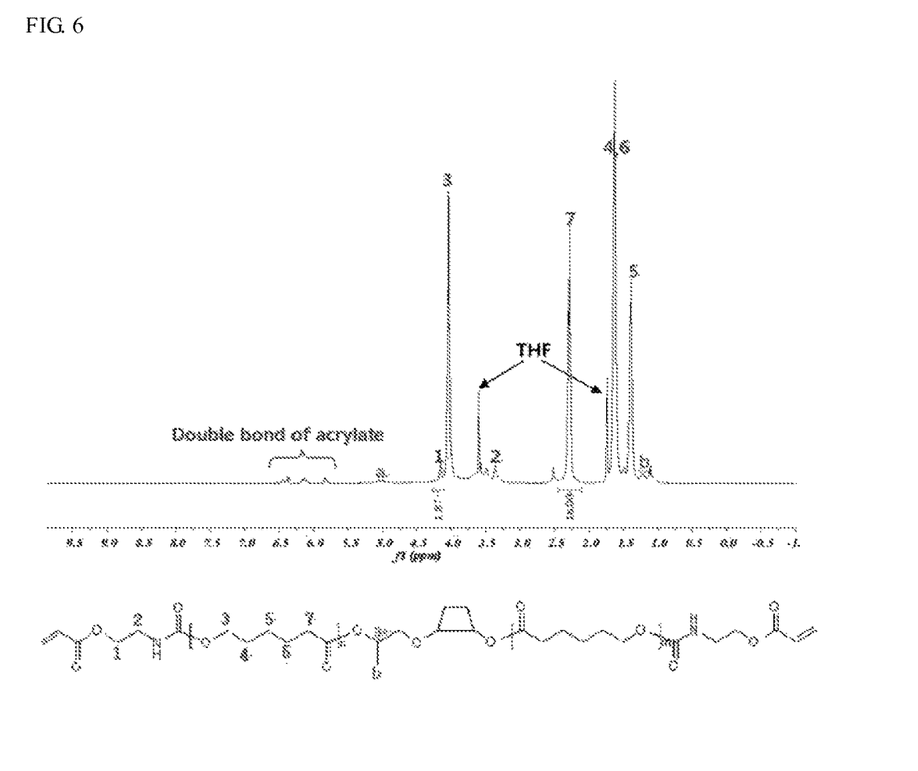
FIG. 6 is a graph illustrating the $^1$H NMR results of polyrotaxanes synthesized according to Examples of the present invention.

Preparation Example 2: UV-Curable Coating Composition 50 g of a caprolactone-engrafted polyrotaxane polymer (A 1000 commercially available from Advanced Soft Material INC) was put into a reactor, and 4.53 g of 2-acryloylethyl isocyanate (Karenz-AOI commercially available from Showa Denko), 20 mg of dibutyltin dilaurate (DBTDL commercially available from Merck), 110 mg of hydroquinone monomethylene ether, and 315 g of methyl ethyl ketone (MEK) were added, and reacted at 70° C. for 5 hours to prepare a polyrotaxane polymer solution (a solid content of 15%) including a polyrotaxane-based compound in which a polycaprolactone-based compound was bound to a cyclic compound of cyclodextrin and a (meth)acrylic compound was introduced into an end of the polycaprolactone-based compound. The $^1$H NMR results of the polyrotaxane obtained thus are shown in FIG. 6.

15 parts by weight of a multifunctional urethane acrylate (UA-200PA commercially available from Shin Nakamura Chemical Co., Ltd.), 15 parts by weight of a multifunctional urethane acrylate (PU-3400 commercially available from Miwon Chemicals Co., Ltd.), 10 parts by weight of a multifunctional urethane acrylate (Miramer SIU2400 commercially available from Miwon Chemicals Co. Ltd.), 15 parts by weight of a polyester-based polyurethane (Estane-5778 commercially available from Lubrizol), 1.5 parts by weight of a photoinitiator, Irgacure-184, 1.55 parts by weight of a photoinitiator, Irgacure-907, 12.5 parts by weight of isopropyl alcohol (IPA), and 12.5 parts by weight of ethyl cellosolve were mixed with 100 parts by weight of the resulting polyrotaxane-based polymer solution to prepare a UV-curable coating composition.

Preparation Example 3: UV-Curable Coating Composition 10 parts by weight of a multifunctional urethane acrylate (UA-200PA commercially available from Shin Nakamura Chemical Co., Ltd.), 10 parts by weight of a multifunctional urethane acrylate (PU-3400 commercially available from Miwon Chemicals Co., Ltd.), 10 parts by weight of a multifunctional urethane acrylate (Miramer SIU2400 commercially available from Miwon Chemicals Co., Ltd.), 30 parts by weight of a polyester-based polyurethane (Estane-5778), 1.5 parts by weight of a photoinitiator, Irgacure-184, 1.55 parts by weight of a photoinitiator, Irgacure-907, 12.5 parts by weight of isopropyl alcohol (IPA), and 12.5 parts by weight of ethyl cellosolve were mixed with 100 parts by weight of the polyrotaxane-based polymer solution prepared in the same manner as in Preparation Example 2 to prepare a UV-curable coating composition.

In the following Example, samples of the cell packing material were prepared using the coating compositions prepared in Preparation Examples 1 to 3, as follows. In this case, the abbreviations used in each of the following Examples and Comparative Examples are as follows: the numbers in the parentheses indicated after the abbreviations represent thicknesses (μm) of layers, and the symbol '/' represents an interlayer.

PP: polypropylene—sealant
PP-a: Unsaturated carboxylic acid graft random propylene—first intermediate layer
Al: Aluminum foil (Al foil)—gas barrier layer
NR: Nylon resin—second intermediate layer
PR-1: Composition coating layer prepared in Preparation Example 1—outer layer
PR-2: Composition coating layer prepared in Preparation Example 2—outer layer
PR-3: Composition coating layer prepared in Preparation Example 3—outer layer
PET: polyethylene terephthalate—outer layer Example 1: Thermal Curing A laminate having a laminated structure of PP (50 μm)/PP-a (12 μm)/Al (25 μm) was prepared, and the thermosetting coating composition prepared in Preparation Example 1 was coated on the Al (25 μm) layer of the laminate using a wire bar (#50). Thereafter, the resulting coating was thermally treated at 60° C. for 5 hours to form an outer layer (PR-1) having a thickness of 20 μm.

Layer structure: PP (50 μm)/PP-a (12 μm)/Al (25 μm)/PR-1 (20 μm)

Example 2: UV Curing

A laminate having a laminated structure of PP (50 μm)/PP-a (12 μm)/Al (25 μm) was prepared, and the UV-curable coating composition prepared in Preparation Example 2 was coated on the Al (25 μm) layer of the laminate using a wire bar (#50). Thereafter, the resulting coating was dried at 60° C. for 2 minutes, and then irradiated with UV rays at 200 mJ/cm$^2$ for 5 seconds to form an outer layer (PR-2) having a thickness of 20 μm.

Layer structure: PP (50 μm)/PP-a (12 μm)/Al (25 μm)/PR-2 (20 μm)

Example 3: UV Curing

A laminate having a laminated structure of PP (50 μm)/PP-a (12 μm)/Al (25 μm) was prepared, and the UV-curable coating composition prepared in Preparation Example 3 was coated on the Al (25 μm) layer of the laminate using a wire bar (#50). Thereafter, the resulting coating was dried at 60° C. for 2 minutes, and then irradiated with UV rays at 200 mJ/cm$^2$ for 5 seconds to form an outer layer (PR-3) having a thickness of 20 μm.

Layer structure: PP (50 μm)/PP-a (12 μm)/Al (25 μm)/PR-3 (20 μm)

Example 4: Thermal Curing

An outer layer was formed in the same manner as in Example 1, except that an NR layer was formed between the Al (25 μm) layer and the PR-1 (20 μm) layer.

More particularly, a laminate having a laminated structure of PP (50 μm)/PP-a (12 μm)/Al (25 μm)/NR (12 μm) was prepared, and the thermosetting coating composition prepared in Preparation Example 1 was coated on the NR (12 μm) layer of the laminate using a wire bar (#50). Thereafter, the resulting coating was thermally treated at 60° C. for 5 hours to form an outer layer (PR-1) having a thickness of 20 μm.

Layer structure: PP (50 μm)/PP-a (12 μm)/Al (25 μm)/NR (12 μm)/PR-1 (20 μm)

Example 5: UV Curing

A laminate having a laminated structure of PP (50 μm)/PP-a (12 μm)/Al (25 μm)/NR (12 μm) was prepared, and the UV-curable coating composition prepared in Preparation Example 3 was coated on the NR (12 μm) layer of the laminate using a wire bar (#50). Thereafter, the resulting coating was dried at 60° C. for 2 minutes, and then irradiated with UV rays at 200 mJ/cm$^2$ for 5 seconds to form an outer layer (PR-3) having a thickness of 20 μm.

Layer structure: PP (50 μm)/PP-a (12 μm)/Al (25 μm)/NR (12 μm)/PR-3 (20 μm)

Comparative Example 1

In this Comparative Example 1, the same sample as in Example 1 was used, except that a PET film having a thickness of 20 μm was dry-laminated on the Al (25 μm) layer instead of the PR-1 (20 μm) layer.

Layer structure: PP (50 μm)/PP-a (12 μm)/Al (25 μm)/PET (20 μm)

Comparative Example 2

In this Comparative Example 2, the same sample as in Example 4 was used, except that a PET film having a thickness of 20 μm was dry-laminated on the NR (12 μm) layer instead of the PR-1 (20 μm) layer.

Layer structure: PP (50 μm)/PP-a (12 μm)/Al (25 μm)/NR (12 μm)/PET (20 μm)

The samples of cell packing materials prepared in Examples and Comparative Examples were evaluated for moldability, a self-healing capability and scratch resistance, as follows. The evaluation results are listed in the following Table 1.

Moldability

Each of the samples of cell packing materials was molded and processed into pouches with a mold size of 58 mm×42 mm×4 mm (a 4.8 mm-thick spacer). Thereafter, the appearances (distortion, etc.) and shape retention of the processed pouch-molded articles were observed with the naked eye. In this case, the pouch-molded articles were evaluated to be "excellent" when the appearance and shape retention were good (no distortion), "satisfactory" when either the appearance or shape retention was not good, and "poor" when neither the appearance nor shape retention was good.

Self-Healing Capability

For each of the samples of cell packing materials, a surface of the outer layer was rubbed with a copper wire brush, and then observed with the naked eye for a period of time during which the surface was restored.

Scratch Resistance

For each of the samples of cell packing materials, steel wool was in close contact with a surface of the outer layer, and the surface of the outer layer was rubbed 10 times under a load of the steel wool. In this case, loads at which scratches were observed with the naked eye were measured under an increasing load (unit: gravity (g)).

TABLE 1

Evaluation results of characteristics of samples of cell packing materials

| Items | Example 1 | Example 2 | Example 3 | Example 4 | Example 5 | Comparative Example 1 | Comparative Example 2 |
|---|---|---|---|---|---|---|---|
| Moldability | Satisfactory | Satisfactory | Excellent | Excellent | Excellent | Poor | Satisfactory |
| Self-healing capability (seconds) | Yes (5) | Yes (7) | Yes (5) | Yes (5) | Yes (5) | None (∞) | None (∞) |
| Scratch resistance (g) | 300 | 350 | 350 | 300 | 350 | 10 | 10 |

As listed in Table 1, it could be seen that the outer layers prepared in Examples of the present invention exhibited excellent moldability into pouches, and also had effectively improved scratch resistance. Also, it could be seen that the outer layers prepared in Examples had a self-healing capability, and thus the scratches were rapidly erased within 5 seconds after the surface of the outer layer was rubbed with the copper wire brush.

According to the exemplary embodiments of the present invention, the cell packing material has improved physical properties. More particularly, according to the exemplary embodiments of the present invention, the cell packing material exhibits excellent elongation, wear resistance, scratch resistance, and chemical resistance. Therefore, the cell packing material can be easily molded into a cell pouch, and exhibit effectively improved durability, and the like.

While the invention has been shown and described with reference to certain exemplary embodiments thereof, it will be understood by those skilled in the art that various changes in form and details may be made therein without departing from the scope of the invention as defined by the appended claims.

What is claimed is:

1. A cell packing material comprising:
a sealant layer;
a gas barrier layer formed on the sealant layer; and
an outer layer formed on the gas barrier layer,
wherein the outer layer comprises a polyrotaxane-based compound at 5 to 88 parts by weight, a polycaprolactone-modified acrylate at 10 to 50 parts by weight, a silicone-modified acrylate at 5 to 30 parts by weight, a urethane acrylate at 10 to 50 parts by weight, and a photoinitiator at 0.01 to 10 parts by weight.

2. The cell packing material of claim 1, wherein the polyrotaxane-based compound comprises a cyclic compound, a linear molecule passing through the cyclic compound, and a blocking group disposed at an end of the linear molecule to prevent secession of the cyclic compound.

3. The cell packing material of claim 1, wherein the polyrotaxane-based compound has a caprolactone-based compound bound thereto.

4. The cell packing material of claim 1, wherein the polyrotaxane-based compound has a (meth)acrylic compound introduced thereinto.

5. The cell packing material of claim 2, wherein the polyrotaxane-based compound comprises the cyclic compound having a caprolactone-based compound bound thereto, and the caprolactone-based compound having a (meth)acrylic compound introduced thereinto.

6. The cell packing material of claim 1, wherein the outer layer has a glass transition temperature ($T_g$) of −80 to 100° C.

7. The cell packing material of claim 1, wherein the cell packing material further comprises an intermediate layer formed between the sealant layer and the gas barrier layer.

8. The cell packing material of claim 7, wherein the intermediate layer comprises an acid-modified polypropylene-based compound.

9. The cell packing material of claim 1, wherein the cell packing material further comprises an intermediate layer formed between the gas barrier layer and the outer layer.

10. The cell packing material of claim 9, wherein the intermediate layer comprises a nylon resin.

11. The cell packing material of claim 1, wherein the cell packing material further comprises:
a first intermediate layer formed between the sealant layer and the gas barrier layer; and
a second intermediate layer formed between the gas barrier layer and the outer layer.

12. The cell packing material of claim 11, wherein the first intermediate layer comprises an acid-modified polypropylene-based compound, and
the second intermediate layer comprises a nylon resin.

13. A method of manufacturing a cell packing material, comprising:
preparing a laminate comprising a sealant layer and a gas barrier layer formed on the sealant layer; and
forming an outer layer on the gas barrier layer,
wherein the outer layer comprises a polyrotaxane-based compound at 5 to 88 parts by weight, a polycaprolactone-modified acrylate at 10 to 50 parts by weight, a silicone-modified acrylate at 5 to 30 parts by weight, a urethane acrylate at 10 to 50 parts by weight, and a photoinitiator at 0.01 to 10 parts by weight.

* * * * *